(12) United States Patent
Lai

(10) Patent No.: US 12,102,896 B2
(45) Date of Patent: Oct. 1, 2024

(54) GOLF BAG WITH STAND ASSEMBLY

(71) Applicant: Wei Hung Lai, Taichung (TW)

(72) Inventor: Wei Hung Lai, Taichung (TW)

( * ) Notice: Subject to any disclaimer, the term of this patent is extended or adjusted under 35 U.S.C. 154(b) by 303 days.

(21) Appl. No.: 17/817,583

(22) Filed: Aug. 4, 2022

(65) Prior Publication Data

US 2024/0042292 A1 Feb. 8, 2024

(51) Int. Cl.
*A63B 55/57* (2015.01)
*A63B 55/60* (2015.01)
*B62B 1/12* (2006.01)

(52) U.S. Cl.
CPC .............. *A63B 55/57* (2015.10); *A63B 55/60* (2015.10); *B62B 1/125* (2013.01)

(58) Field of Classification Search
CPC ......... A63B 55/57; A63B 55/60; A63B 55/00; A63B 55/10; A63B 55/30; B62B 1/125
See application file for complete search history.

(56) References Cited

U.S. PATENT DOCUMENTS 8,616,369 B2 * 12/2013 Campbell
11,738,247 B2 * 8/2023 Chorne

* cited by examiner

*Primary Examiner* — James A Shriver, II
*Assistant Examiner* — Nicholas R. Kandas
(74) *Attorney, Agent, or Firm* — Sinorica International

(57) ABSTRACT

A golf bag includes a base, two wheels, a bag body and a stand assembly. The base has a first base member and a second base member. The first base member has a first bottom side. The second base is pivoted on the first base member to be turned between a first position and a second position. The bag body is connected to the base, and is turned between a third position and a fourth position. The stand assembly has two stands, which are turned between a fifth position and a sixth position. Wherein, the golf bag can be switched between an upright status and a self-standing status. In the upright status, the golf bag has both the first bottom side and the second bottom side touch the ground. In the self-standing status, the golf bag has the first bottom side and distal ends of the stands touch the ground.

10 Claims, 8 Drawing Sheets

GOLF BAG WITH STAND ASSEMBLY

BACKGROUND OF THE INVENTION

1. Technical Field

The present invention relates to an accessory of golf club, and more particularly to a wheeled golf bag with a stand assembly.

2. Description of Related Art

In golf sport, there are many clubs for a golfer too choose to swing on a field, such as wood clubs, iron clubs, and putter. Therefore, the golfer needs to carry a dozen of clubs on the field. In order to carry the clubs, golf bags are presented in the market. With the golf bag the golfer may carry clubs to play golf on a golf field.

However, carry the golf bag is an unpleasant thing since the bag is heavy and there is a long distance to walk. A wheeled golf bag is presented in the market to fix this problem. The wheeled golf bag has wheels for the golfer to drag the bag to walk on the field.

The conventional golf bag has to stand on the field by itself to wait for the golfer swinging. However, the field is not always flat, and the conventional golf bag may not stand stably on a rugged place. To fix this problem, a golf bag with stands is presented in the market. Such golf bag has two stands pivoted on the bag. The stands may be pulled out to form two of the three supports (two stands and the bottom of the bag) of the bag when the bag is put to stand on the field, and that makes the golf bag stand stably in a tilted condition.

BRIEF SUMMARY OF THE INVENTION

In view of the above, the primary objective of the present invention is to provide a golf bag with a stand assembly, which provides a stable standing status when the golf bag is put to stand by itself.

In order to achieve the objective of the present invention, a golf bag includes a base, two wheels, a bag body and a stand assembly. The base has a first base member and a second base member. The first base member has a first bottom side, and the second base member has a second bottom side. The second base is pivoted on the first base member to be turned between a first position and a second position. When the second base member is moved to the first position, the first bottom side and the second bottom side become coplanar; when the second base member is moved to the second position, the first bottom side and the second bottom side become not coplanar. The wheels are pivoted on the first base member of the base, and the treads of the wheels keep a distance from the first bottom side of the first base member. The bag body has an end which is connected to the base. The bag body is turned to a third position when the second base member is moved to the first position; and the bag body is moved to a fourth position when the second base member is moved to the second position. The stand assembly has two stands which is pivoted on the bag body, and the stands are turned between a fifth position and a sixth position, wherein the stands move toward the bag body when the stands move to the fifth position from the sixth position, and the stands move away from the bag body when the stands move to the sixth position from the fifth position. Wherein the golf bag is switched between an upright status and a self-standing status; in the upright status, the second base member is turned to the first position, the bag body is turned to the third position, and the stands are turned to the fifth position, whereby the golf bag has both the first bottom side and the second bottom side touch the ground in the upright status; in the self-standing status, the second base member is turned to the second position, the bag body is turned to the fourth position, and the stands are turned to the sixth position, whereby the golf bag has the first bottom side and distal ends of the stands touch the ground in the self-standing status.

In an embodiment, one of the first base member and the second base member is provided with a rod, and the other one of which is provided with a rail; the rail has a first end and a second end; the rod engages the rail to move between the first end when the second base member is turned to the first position and the second end when the second base member is turned to the second position.

In an embodiment, the first base member is provided with a first limiting member, and the bag body is provided with a second limiting member; the second limiting member engages the first limiting member to move on the first limiting member when the bag body is turned between the third position and the fourth position.

In an embodiment, one of the first limiting member and the second limiting member has a shaft, and the other one of which has a slot; the shaft engages the slot to move in the slot when the bag body is turned between the third position and the fourth position.

In an embodiment, the bag body has a frame, on which the second limiting member is provided.

In an embodiment, further comprising an elastic member connected to the first limiting member and the stand assembly to provide the stands a spring force to force the stands to move toward the fifth position.

In an embodiment, the stand assembly further includes a linkage pivoted on the base and connected to the stands, and the elastic member is connected to the linkage.

In an embodiment, the bag body has a flat, and the flat has an opening; the linkage has an end pivoted on the first base member, and extends out of the flat through the opening.

In an embodiment, the bag body has a frame and a flat; the frame is fixed to an inner side of the flat, and the flat has an end connected to the base; the second base member is provided with a plurality of shafts, and the shafts are connected to the frame, whereby the bag body is turned between the third position and the fourth position when the second base member is turned to the first position and the second position through the shafts and the frame.

In an embodiment, the bag body leans toward a side where the wheels are provided when the bag body is turned to the fourth position.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
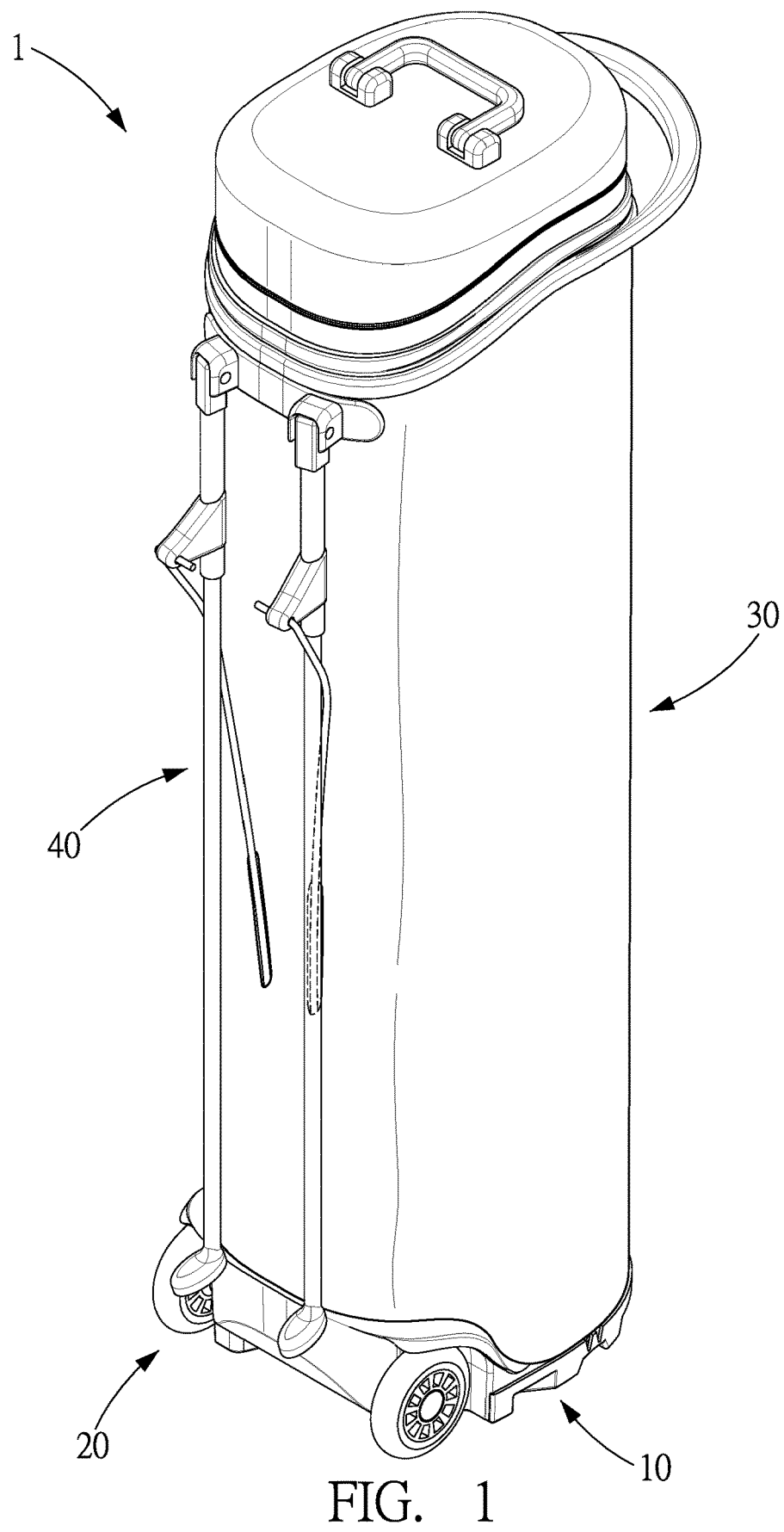
FIG. 1 is a perspective view of a preferred embodiment of the present invention.
Figure 2:
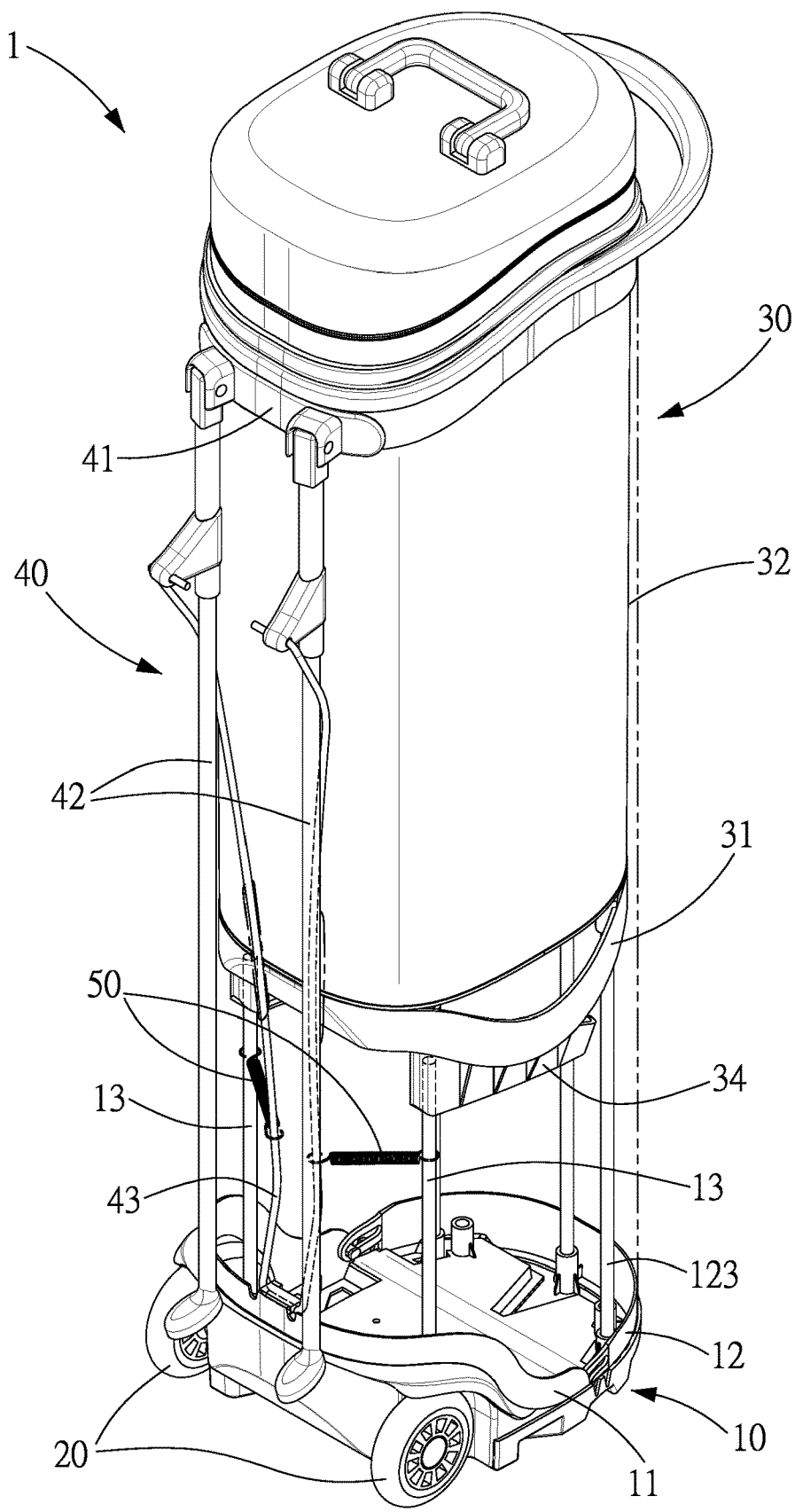
FIG. 2 is a perspective view of the preferred embodiment of the present invention, showing the bag body being removed.
Figure 3:
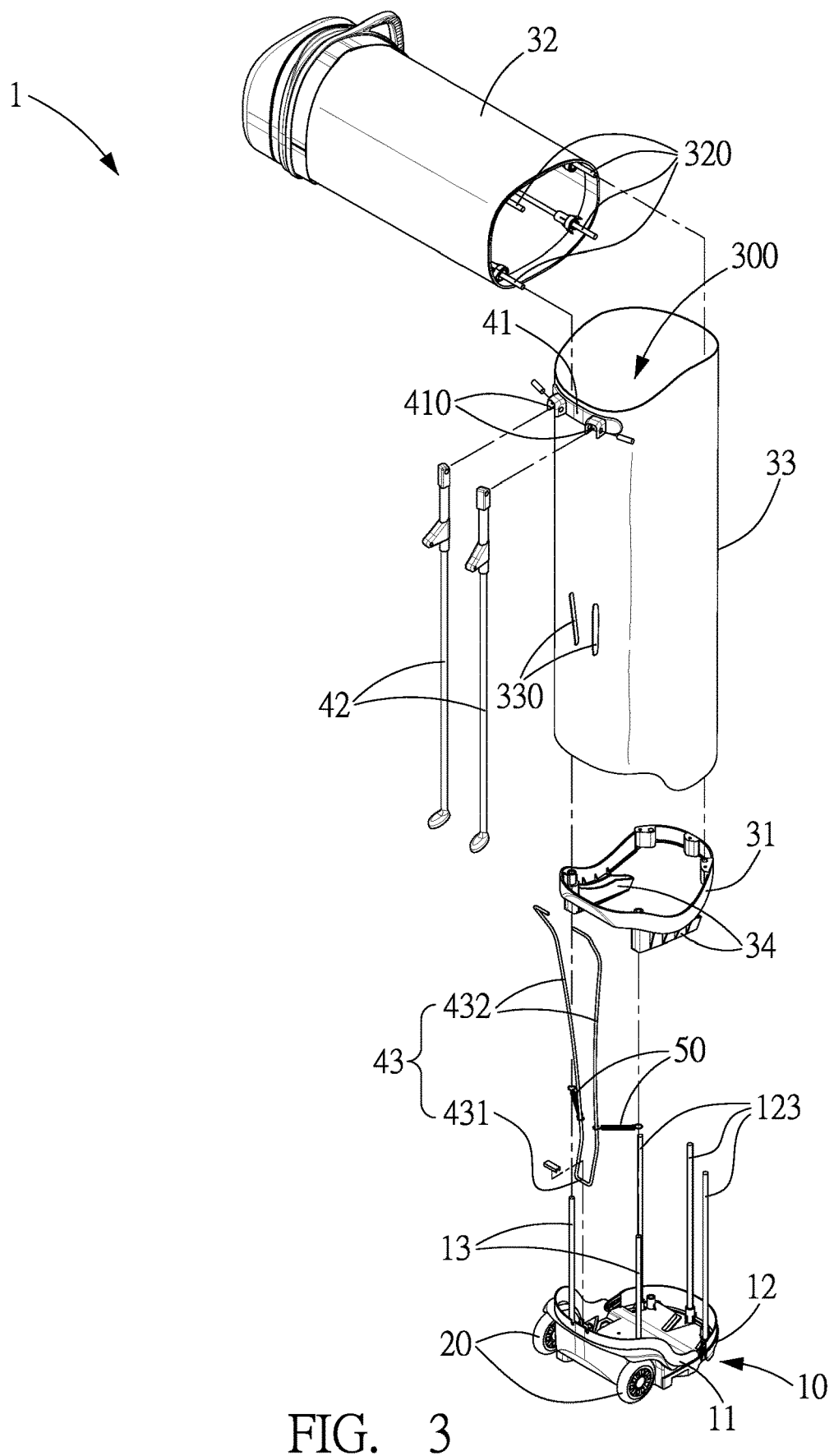
FIG. 3 is an exploded view of the preferred embodiment of the present invention.
Figure 4:
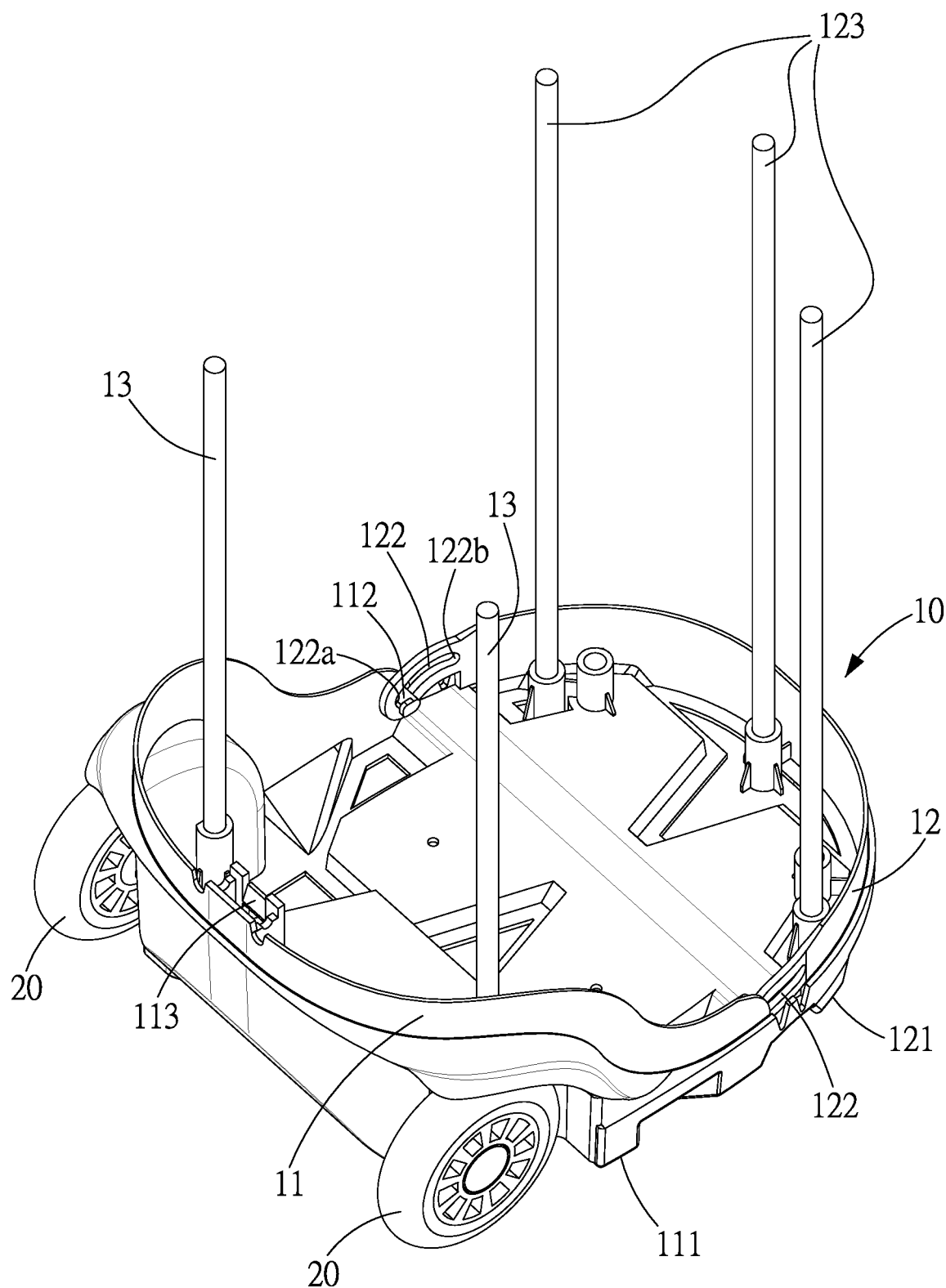
FIG. 4 is a perspective view of the base of the preferred embodiment of the present invention.
Figure 5:
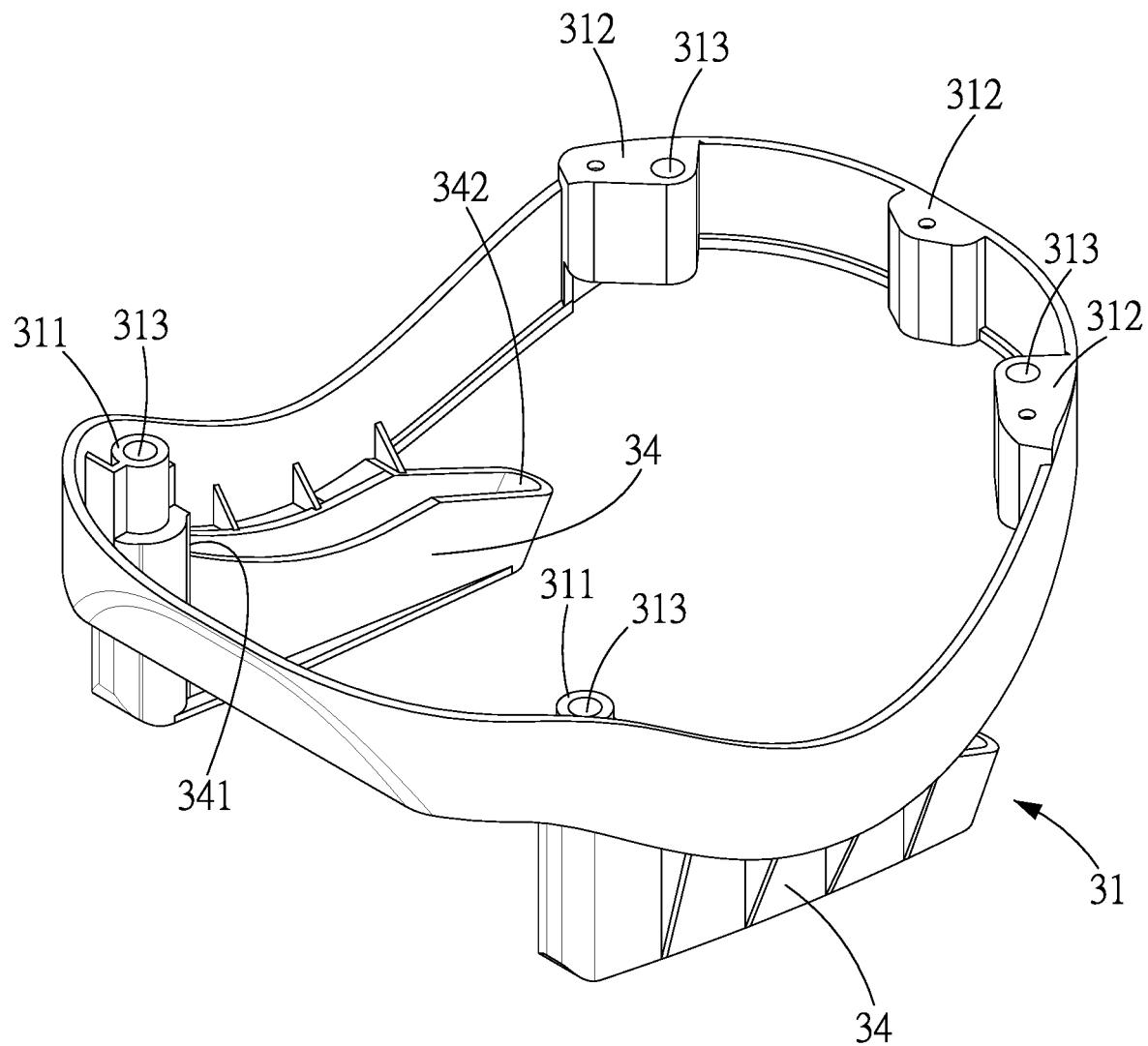
FIG. 5 is a perspective view of the frame of the preferred embodiment of the present invention.

As shown in FIG. 1, a golf bag 1 of the preferred embodiment of the present invention includes a base 10, two wheels 20, a bag body 30, and a stand assembly 40.

As shown in FIG. 2 to FIG. 5, the base 10 includes a first base member 11, a second base member 12, and a first limiting member. The second base member 12 is pivoted on the first base member 11, so that the second base member 12 is able to be turned between a first position and a second position. The first base member 11 is a rigid semi-circular block, having a first bottom side 111. The first base member 11 further has two rods 112 adjacent to a flat side and a slot 113 adjacent to a circular side. The second base member 12 is a semi-circular block as well with a flat side pivoted to the flat side of the first base member 11 to form the base 10 with a substantially round shape. The second base member 12 has a second bottom side 121, wherein the first bottom side 111 of the first base member 11 and the second bottom side 121 of the second base member 12 form the largest bottom area of the base 10. The second base member 12 further has two rails adjacent to the flat side. The rails 122 are elongated and curved slots in the present embodiment, each of which has a first end 122a and a second end 122. The rods 112 of the first base member 11 engage the rails 122 of the second base member 12 to pivot the second base member 12 on the first base member 11, and the second base member 12 moves between the first position (the rods 112 touch the first ends 122a of the rails 122) and the second position (the rods 112 touch the second ends 122b of the rails 122). In the first position, the first base member 11 and the second base member 12 are parallel (FIG. 6) and the first bottom side 111 and the second bottom side 121 are coplanar, and in the second position, the second base member 12 turns upwards for a predetermined angle to make the first bottom side 111 and the second bottom side 121 be not coplanar. In an alternate preferred embodiment, the first base member has the rails and the second base member has the rods (not shown). Three shafts 123 have ends connected to the second base member 12. In the present embodiment, the first limiting member has two limiting shafts 13 with ends connected to the first base member 11. Lengths of the shafts 123 are greater than lengths of the limiting shafts 13 of the first limiting member.

Figure 6:
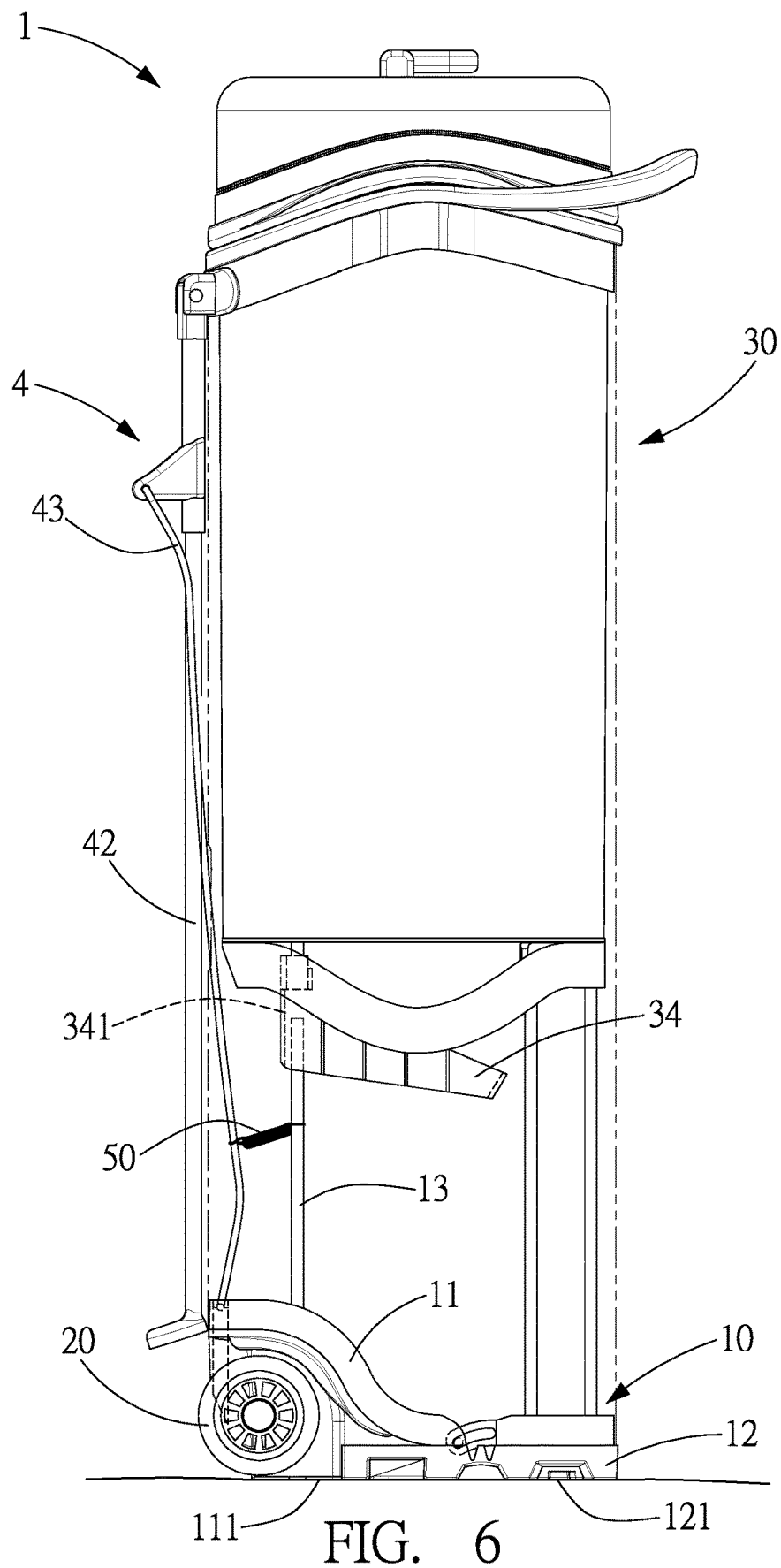
FIG. 6 is a perspective view of the preferred embodiment of the present invention, showing the golf bag in the upright condition.
Figure 7:
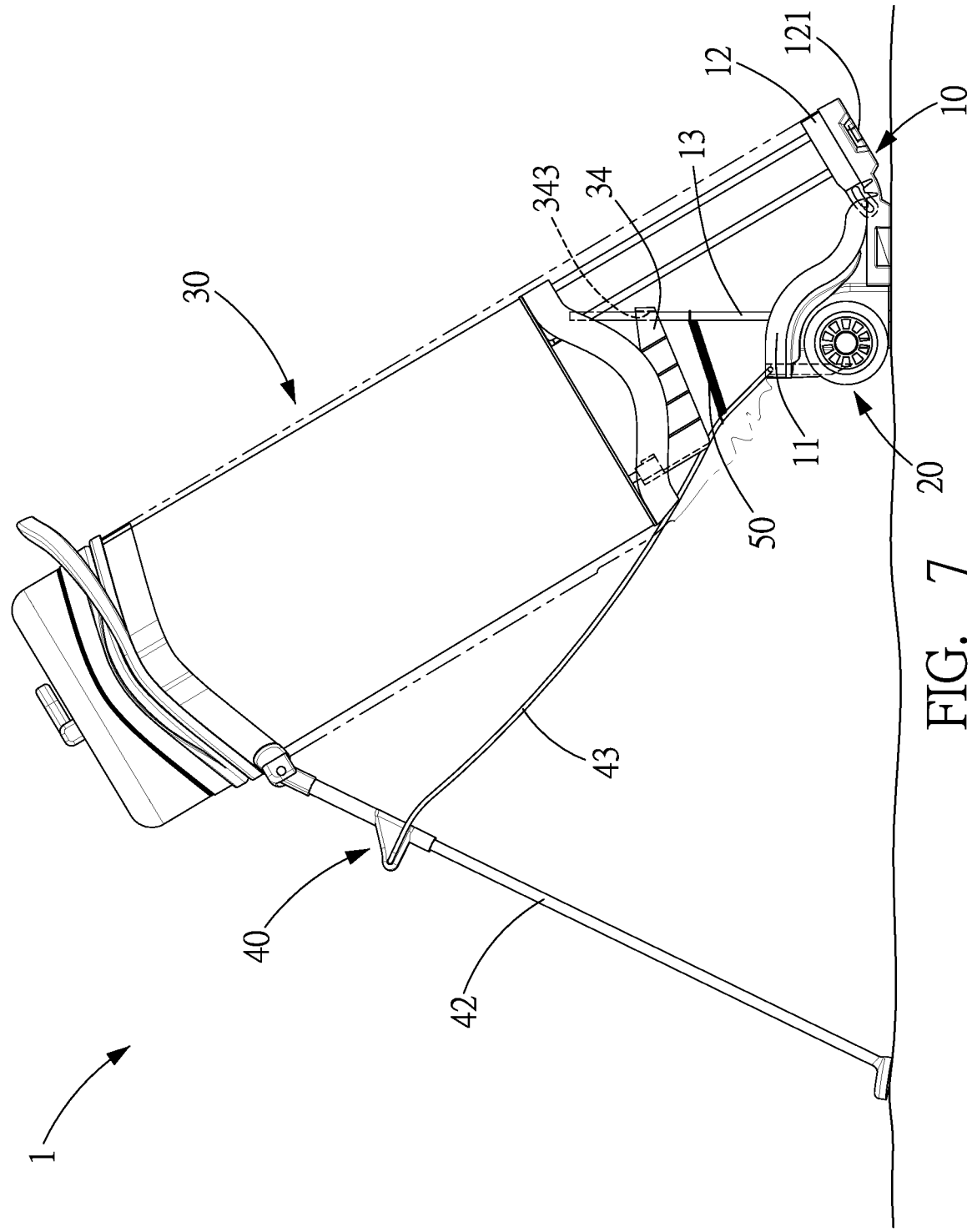
FIG. 7 is a perspective view of the preferred embodiment of the present invention, showing the golf bag in the self-standing condition.

The wheels 20 are pivoted on the first base member 11. The wheels 20 each has a tread, and the tread is higher than the first bottom side 111 of the first base member 11, which means that the wheels 20 are kept a distance from the ground when the first bottom side 111 of the first base member 11 touches the ground (FIGS. 6 and 7). The wheels will touch the ground only when the golf bag 1 leans for a predetermined angle (FIG. 8), and the first bottom side 111 of the first base member 11 will leaves the ground when the wheels 20 touch the ground.

The bag body 30 is a barrel-like flexible member, having an end connected to the base 10. The bag body 30 is moved between the third position and a fourth position when the second base member 12 is moved between the first position and the second position. The bag body has a frame 31, a hood 32, a flat 33, and a second limiting member. The frame 31 is a rigid ring, having a plurality of first fixing portions 311 and second fixing portions 312, and each of the first and the second fixing portions 311 and 312 has a bore 313. Ends of the shafts 123 of the second base member 12 are connected to the second fixing portions 312 respectively, so that the movement of the second base member 12 moves the frame 31. The hood 32 has a plurality of frame shafts 320 on an inner side, which have ends connected to the bores 313 of the first and the second fixing portions 311 and 312 of the frame 31. As a result, the hood 32 is moved with the frame 31. The flat 33 is a barrel-like member, having an end connected to the base 10 to enclose the frame 31 and the hood 32 therein. The flat 33 has a chamber 300 therein to store golf clubs (not shown) and two openings 330 communicated with the chamber 300. The second limiting member has two limiting rails 34 fixed to the frame 31. The rails 34 each has a slot in the present invention to engage the limiting shafts 13 of the first limiting member. In the present preferred embodiment, each of the rails has a third end 341 and a fourth end 342, and the limiting shafts 13 touch the third ends 341 when the bag member 30 is moved to the third position, and the limiting shafts 13 touch the fourth ends 342 when the bag body 30 is moved to the fourth position to limit a range of motion of the bag member 30. In an alternate embodiment, the limiting rails are connected to the first base member while the limiting shafts are connected to the frame.

The stand assembly 40 has a stand base 41, two stands 42, and a linkage 43. The stand base 41 is fixed to an outer side of the flat 33, and has two recesses 410. The stands 42 have ends pivoted in the recesses 410 of the stand base 41. The stands 42 are able to be moved between a fifth position and a sixth position, wherein the stands 42 are moved toward the bag body 30 to the fifth position, and moved away from the bag body 30 to the sixth position. In the present embodiment, the stands 42 are attached to the flat 33 when they moved to the sixth position. The linkage 43 has a U-shaped bar, having two parallel free sections 431 and a connection section 432, wherein the connection section 432 has opposite ends connected to the free sections 431. The connection section 432 is received in the slot 113 to be pivoted on the first base member 11, and the free sections 431 extend out of the flat 33 through the openings 330 to be pivoted on the stands 42 respectively. The linkage 43 may temporally hold the stands 42 at the fifth position and at the sixth position.

The present embodiment further includes two elastic members 50. The elastic members 50 are spring in the present embodiment, having opposite ends connected to the free sections 432 of the linkage 43 and the limiting shafts 13 of the first limiting member to provide the linkage 43 a spring force to force the stands 42 toward the fifth position when the stands 42 just leave the sixth position.

The golf bag 1 of the preferred embodiment of the present invention is able to be switched between an upright status (FIG. 6) and a self-standing status (FIG. 7).

Figure 8:
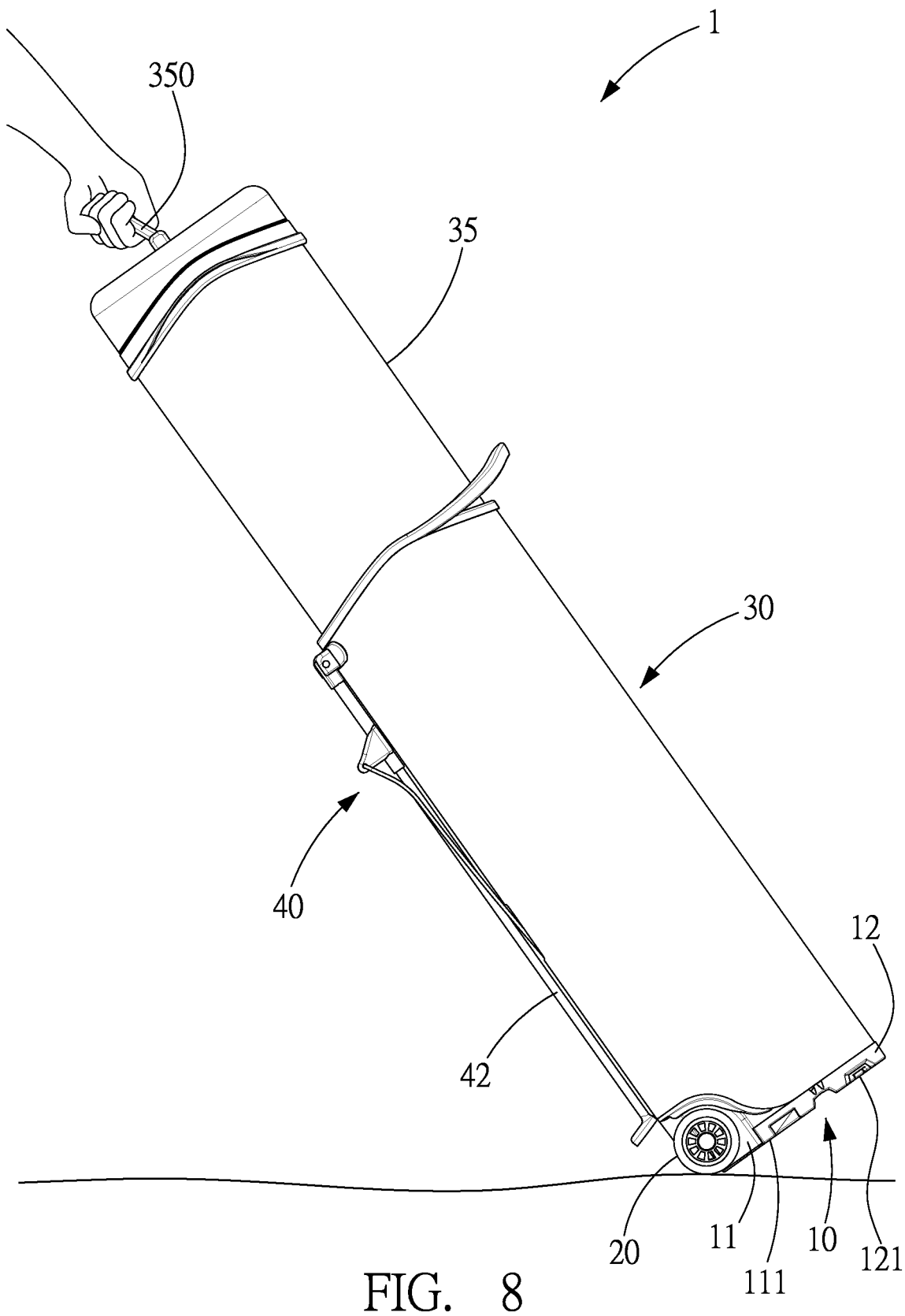
FIG. 8 is a perspective view of the preferred embodiment of the present invention, showing the golf bag being dragged to move.

As shown in FIG. 6, in the upright status, the second base member 12 is moved to the first position, the bag body 30 is moved to the third position, and the stands 42 are moved to the fifth position. In other words, both the first bottom side 111 of the first base member 11 and the second bottom side 121 of the second base member 12 touch the ground, the bag body 30 is straight, and the stands 42 are attached to the bag body 30. In the upright status, the golf bag 1 has the largest bottom area to stand on a flat place. It is noted that the wheels 20 do not touch the ground when the golf bag 1 is switched to the upright status and stands on the ground. However, the wheels 20 will touch the ground and the base 10 will leave the ground when the golf bag 1 is leaned to a predetermined angle (FIG. 8). In such status, a golfer may drag the golf bag 1 to walk.

As shown in FIG. 7, the golfer may switch the golf bag 1 to the self-standing status when he needs to swing on a rugged place. In the self-standing status, the second base member 12 is moved to the second position, the bag body 30 is moved to the fourth position, and the stands 42 are moved to the sixth position. In other words, the second base member 12 tilts up, the bag body 30 leans toward a side where the stands 42 and the wheels are provided, and the stands 42 are moved away from the bag body 30. In this status, the first bottom side 111 of the first base member 11 and two distal ends of the stands 42 touch the ground to form three supports of the golf bag 1 that may make the golf bag 1 stand stably on a rugged place.

In conclusion, the golf bag 1 of the preferred embodiment provides the second base member 12 to be turned between the first position and the second position. Therefore, the golf bag 1 will have the largest bottom area to stand on the flat place in the upright status, and the golf bag 1 will have three supports (the first base member 11 and the stands 42) to stand on the rugged place. Furthermore, the golf bag 1 is equipped with the wheels 20 for dragging to move.

It must be pointed out that the embodiments described above are only some preferred embodiments of the present invention. All equivalent structures which employ the concepts disclosed in this specification and the appended claims should fall within the scope of the present invention.

What is claimed is:

1. A golf bag, comprising:
    a base having a first base member and a second base member, wherein the first base member has a first bottom side, and the second base member has a second bottom side; the second base member is pivoted on the first base member to be turned between a first position and a second position; the first bottom side and the second bottom side are coplanar when the second base member is moved to the first position, and the first bottom side and the second bottom side are not coplanar when the second base member is moved to the second position;
    two wheels pivoted on the first base member of the base, wherein treads of the wheels are kept a distance from the first bottom side of the first base member;
    a bag body having an end connected to the base, wherein the bag body is turned to a third position when the second base member is moved to the first position and moved to a fourth position when the second base member is moved to the second position; and
    a stand assembly having two stands pivoted on the bag body to be turned between a fifth position and a sixth position, wherein the stands move toward the bag body when the stands move to the fifth position from the sixth position, and the stands move away from the bag body when the stands move to the sixth position from the fifth position;
    wherein the golf bag is switched between an upright status and a self-standing status; in the upright status, the second base member is turned to the first position, the bag body is turned to the third position, and the stands are turned to the fifth position, whereby the golf bag has both the first bottom side and the second bottom side touch the ground in the upright status; in the self-standing status, the second base member is turned to the second position, the bag body is turned to the fourth position, and the stands are turned to the sixth position, whereby the golf bag has the first bottom side and distal ends of the stands touch the ground in the self-standing status.

2. The golf bag of claim 1, wherein one of the first base member and the second base member is provided with a rod, and the other one of which is provided with a rail; the rail has a first end and a second end; the rod engages the rail to move between the first end when the second base member is turned to the first position and the second end when the second base member is turned to the second position.

3. The golf bag of claim 1, wherein the first base member is provided with a first limiting member, and the bag body is provided with a second limiting member; the second limiting member engages the first limiting member to move on the first limiting member when the bag body is turned between the third position and the fourth position.

4. The golf bag of claim 3, wherein one of the first limiting member and the second limiting member has a shaft, and the other one of which has a slot; the shaft engages the slot to move in the slot when the bag body is turned between the third position and the fourth position.

5. The golf bag of claim 3, wherein the bag body has a frame, on which the second limiting member is provided.

6. The golf bag of claim 3, further comprising an elastic member connected to the first limiting member and the stand assembly to provide the stands a spring force to force the stands to move toward the fifth position.

7. The golf bag of claim 6, wherein the stand assembly further includes a linkage pivoted on the base and connected to the stands, and the elastic member is connected to the linkage.

8. The golf bag of claim 7, wherein the bag body has a flat, and the flat has an opening; the linkage has an end pivoted on the first base member, and extends out of the flat through the opening.

9. The golf bag of claim 1, wherein the bag body has a frame and a flat; the frame is fixed to an inner side of the flat, and the flat has an end connected to the base; the second base member is provided with a plurality of shafts, and the shafts are connected to the frame, whereby the bag body is turned between the third position and the fourth position when the second base member is turned to the first position and the second position through the shafts and the frame.

10. The golf bag of claim 1, wherein the bag body leans toward a side where the wheels are provided when the bag body is turned to the fourth position.

* * * * *